FLUID-ACTUATED TRANSLATING AND PRINTING MEANS

Filed March 29, 1965 2 Sheets-Sheet 1

INVENTORS
GEORGE A. GIANNUZZI
DONALD W. HANEY
BY K. P. Johnson
ATTORNEY

United States Patent Office 3,343,481
Patented Sept. 26, 1967

3,343,481
FLUID-ACTUATED TRANSLATING AND PRINTING MEANS

George A. Giannuzzi and Donald W. Haney, Vestal, N.Y., assignors to International Business Machines Corporation, Armonk, N.Y., a corporation of New York Filed Mar. 29, 1965, Ser. No. 443,288
8 Claims. (Cl. 101—93)

This invention relates generally to pneumatic interpreting and printing mechanisms and more particularly to apparatus for selectively suppressing the operation of printing elements in those mechanisms.

Portions of the apparatus herein described have been described and claimed in an application for Letters Patent by C. J. Fitch, filed June 18, 1964, bearing Ser. No. 376,189, and assigned to the assignee of this application.

Machine processing of unit record documents, such as punched cards, frequently necessitates passing the documents through an interpreting machine. Data originally recorded in one form, such as coded, columnar holes or marks, are translated into printed numeric or alphabetic characters. As the documents pass through the machine, each column of data is sensed by a translating mechanism which then controls the selection of the proper character to be printed on the document being sensed or another document In the interpreting process, it is often desirable to translate and print only selected columns of information while omitting a field of other data columns.

The omission of selected columns is relatively easy in machines in which the columns are translated concurrently or in parallel. In these machines each column has its own sensing and printing elements, and one or the other of these elements is disabled for designated columns so that all documents in a batch receive no interpretation for the designated field. However, in serially operated machines, where the document passes through the machine column by column, there are provided only one sensing and one printing element for each character Each of these elements must be operable to translate the columnar information desired and then inoperable for the omitted fields with the passage of each document.

The alternate enabling and disabling of the printing or the sensing elements must, therefore, be co-ordinated with the position and timing of the document movement in order to accurately omit the designated data fields. The selective operation of translating and printing devices further demands rapid and reliable control. It will be noted that the location of an omitted field in one format may be different than that in another format. Thus, the selection of disabling and enabling control is required to be adapted for alteration according to the format used.

Accordingly, it is a primary object of this invention to provide apparatus for selectively suppressing the operation of a printing interpreter in accordance with predetermined data fields on a record document.

Another object of this invention is to provide control apparatus for an interpreter which can be readily altered so that the suppression of printing can be transposed from one data field to another in accordance with the documents processed thereby.

A further object of this invention is to provide apparatus for selectively controlling fluid-actuated interpreting apparatus of the randomly operable type so that only selected ones of a plurality of data columns are interpreted and recorded on a document.

Still another object of this invention is to provide selectively effective suppression apparatus for a fluid-operated interpreter with which the fluid flow through the interpreter can be altered in accordance with the document data fields.

The invention accomplishes the foregoing objects by providing a plurality of fluid-actuated translating and printing means which are each connected to a source of pressurized fluid through a distributor means. Fluid control means at the distributor means move in synchronism with the document being translated and are effective to reduce the supply pressure of the fluid sufficiently to render the connected translating means inoperable. The control means, however, are so arranged that selected ones of the translating means are inoperable only for the time that the designated data columns are present at the affected translating means.

The invention advantageously provides pressure control apparatus utilizing a disc of imperforate material that is selectively perforated according to the processed format. The perforations permit the exhaust of pressurized fluid from supply channels to a low pressure sump whereby particular character decoding means in the interpreter are disabled.

The foregoing and other objects, features and advantages of the invention will be apparent from the following more particular description of a preferred embodiment of the invention, as illustrated in the accompanying drawings, wherein.

Figures 1, 3:
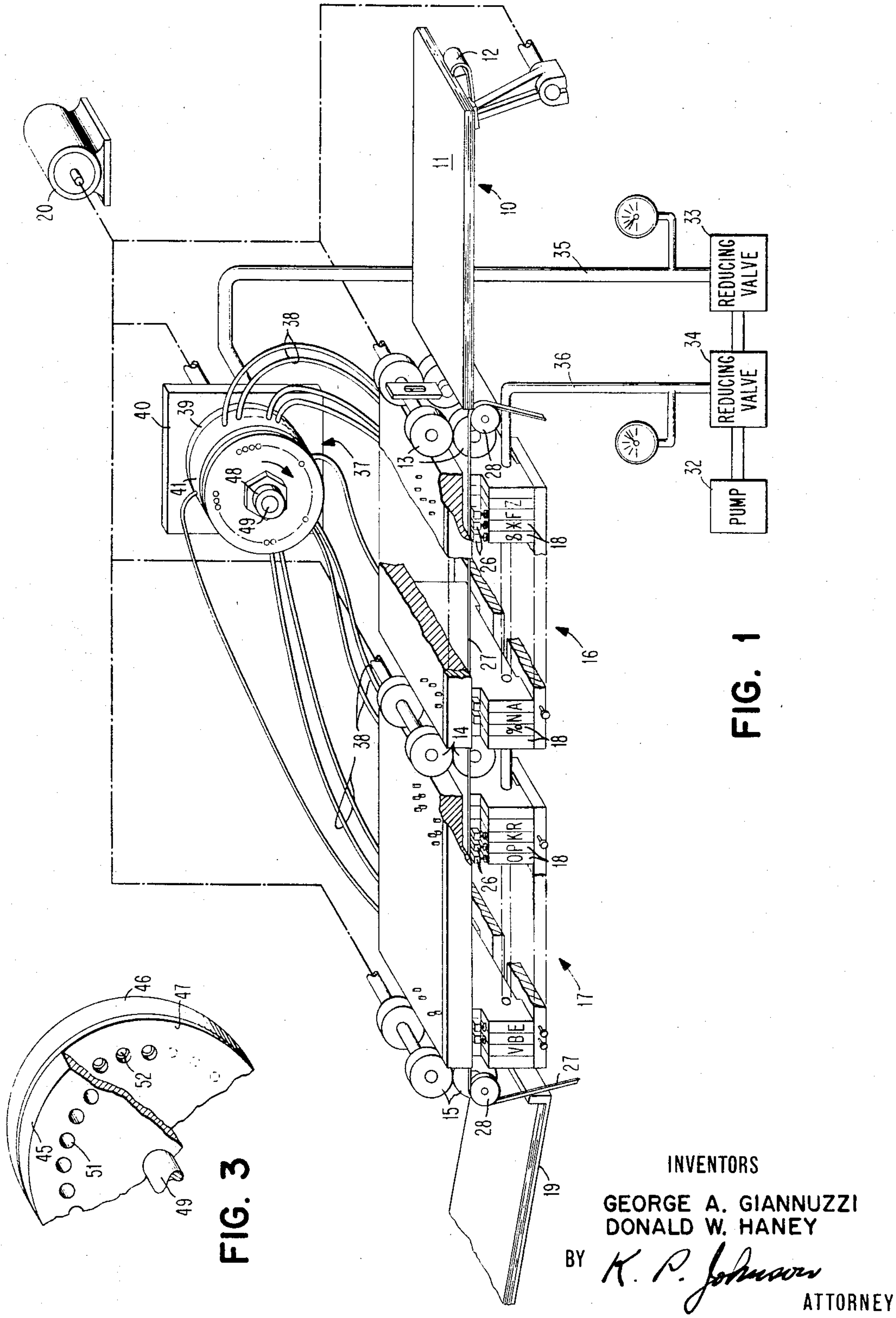
FIGURE 1 is a perspective schematic view of a fluid-operated interpreting mechanism in conjunction with the fluid distributing and suppression control apparatus therefor in accordance with the invention.
FIGURE 3 is a partial perspective view of the fluid distributor broken away to show the pressure control discs used therewith.

Referring to FIG. 1, the fluid-operated interpreter apparatus, which is to be selectively controlled, comprises generally a hopper 10 for receiving a stack of perforated record documents 11, an oscillatory feeding knife 12, feed roll pairs 13, 14 and 15 for transporting the documents, a first and second plurality 16 and 17 of combined decoding and recording modules 18, and a stacker pocket 19 for receiving the interpreted documents. The feed knife and feed roll pairs are driven by a motor 20 through any suitable mechanical coupling indicated by the broken lines. Although the interpreter and the decoding modules 18 have been shown and described in the aforementioned patent application, they will be described herein in conjunction with the selective control apparatus.

The documents are fed singly and in serial fashion, column by column by picker knife 12 which pushes a card into the grip of rotating feed rolls 13 so that the document is then driven through the decoding slot of modules 18 of first plurality 16. Upon emerging from the first plurality of modules, the card is gripped by feed rolls 14 and the process is repeated for plurality 17 whereupon feed rolls 15 drive the documents into the stacker. The decoding modules 18 are divided into two pluralities to permit feed rolls 14 to be interposed between rolls 13 and 15 in the event that the documents being processed are too short to extend between the latter feed rolls.

As a document passes through the decoding slots of the modules, each module senses each card column for a particular and unique arrangement of perforations therein. For purposes of explanation, it is assumed that the documents being decoded are well known tabulating cards each containing 80 data columns with each column having 12 index positions, any of which can contain a perforation. When one of the modules 18 senses its unique columnar arrangement of perforations, it responds by actuating a print hammer 26 upward against a conventional ink ribbon 27, leaving an impression for that card column along the underside of the top margin of the card. Hammer 26 has a character engraved on its top surface which corresponds to the perforation arrangement of the document and has a flat surface adjacent the module to prevent rotation during operation. Ink ribbon 27 may be driven over idler rolls 28 by any well-known means.

The translation of a columnar arrangement of perforations into printed characters is accomplished by sensing the presence and absence of holes with a pressurized fluid such as air. The air is supplied from a conventional pump 32 to pressure reducing valves 34 and 33. The air from valve 34 is at a high pressure, approximately 8 p.s.i.g. and the air from valve 33 is at a lower pressure, approximately 3 p.s.i.g. The air is supplied through respective ducts 36 and 35 to the decoding modules 18. The high pressure air is used to actuate the print hammers, and the low pressure air is used to sense the perforations in the document columns.

Figure 2:
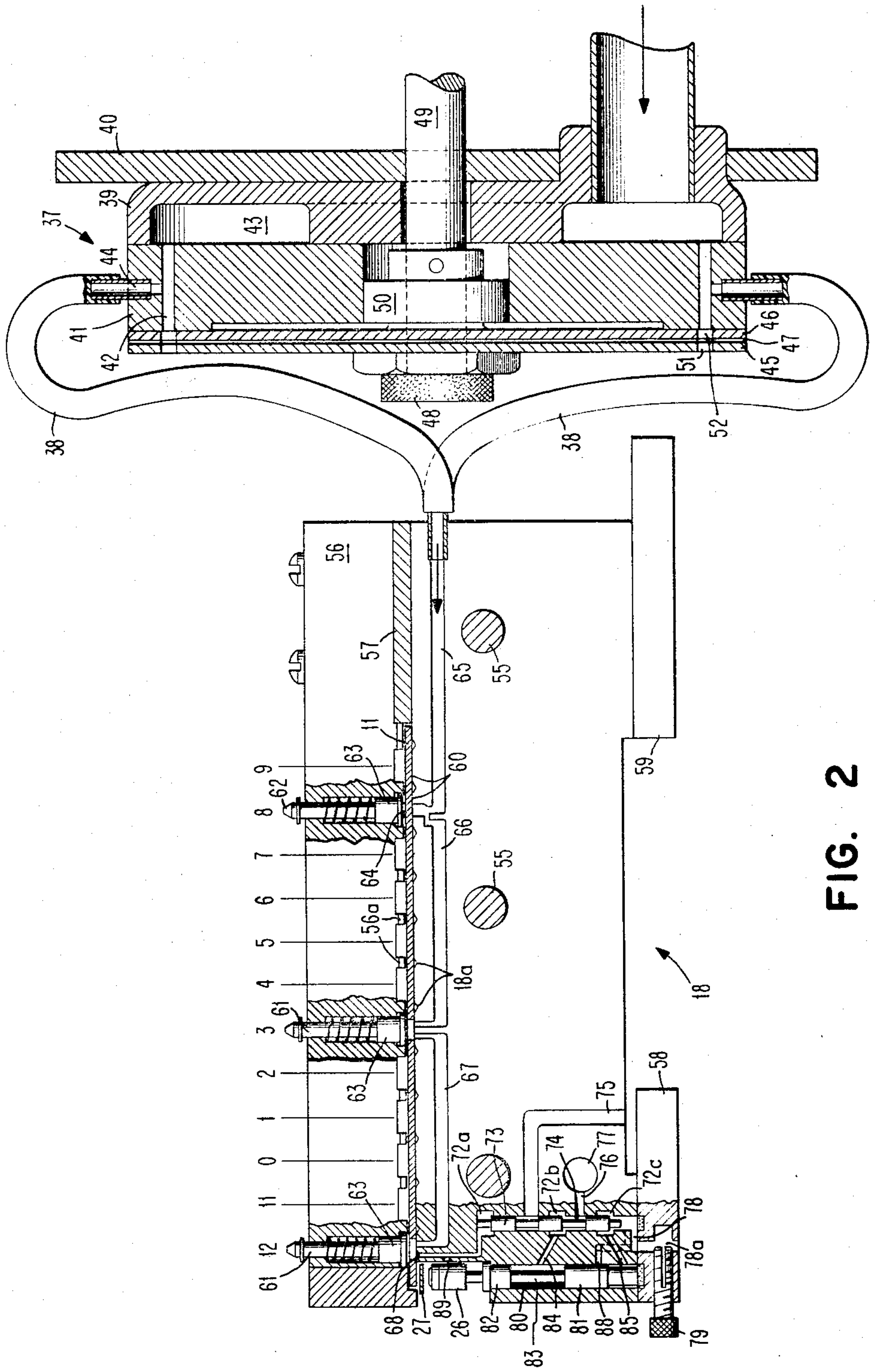
FIGURE 2 is an elevation view of a fluid-operated character decoding module connected to the fluid distributor in the interpreter with parts broken away.

In FIG. 2, each of the decoding modules 18 receives its supply of low pressure air from a distributor assembly 37 via one of the connecting tubes 38. The distributor comprises an annular manifold 39 secured in a suitable manner to supporting bracket 40. There is, in turn, secured to the manifold a distributor 41 which is provided with channels 42 communicating with an annular chamber 43 in the manifold. Each tube 38 is connected to a duct 44 which communicates with channel 42. At the left side of distributor 41 there are a pair of movable support discs 45 and 46 which have sandwiched therebetween an imperforate control disc 47. The assembly of discs 45, 46 and 47 are held against distributor 41 by a knurled knob 48 which is secured to a shaft 49 that is connected to the drive motor. Shaft 48 is supported for rotation in bearing 50 in the distributor and the assembly of discs 45–47 and knurled knob 48 rotate with the shaft. Each of the discs 45, 46 has coinciding respective holes 51, 52 formed therein which are separated by imperforate disc 47. The peripheral spacing of ducts 42 and radially extending ducts 44 is equivalent to the spacing of code plates 18 and include a blind space equal to the distance between the end decoding modules in each plurality adjacent feed rolls 14. However, the spacing between adjacent holes 51 of disc 45 and adjacent holes 52 of disc 46 are equivalent to the spacing of columns in the document being interpreted. As long as disc 47 remains imperforate, all tubes 38 will be supplied with low pressure air in their respective channels 42 and 44. Thus, each module or code plate 18 will be enabled to sense a document column as the document passes therethrough. Should disc 47 be perforated at a location coinciding with holes 51 and 52, the low pressure air is permitted to leak to atmosphere or other suitable exhaust sump. This decreases the pressure available in the radially extending channel 44 at that position so that the decoding module 18 connected thereto is inoperative, as will be explained below. The size of holes 51, 52 at channels 42, 44 will vary in accordance with the pressure and volume of air which must be vented to the atmosphere to render the module inoperative. The time at which holes 51 and 52 vent channel 42, relative to the approach of the corresponding document column, will also vary because of the fluid resistance in the ducts. Thus, some lead time of the disc in relation to the document is necessary. For the time being, it will be assumed that disc 47 remains imperforate. Therefore, low pressure air at an operable level is supplied to each of the decoding modules.

Character sensing or decoding is accomplished by attempting to pass a pressurized fluid signal serially through a plurality of fluid-conveying ducts formed in one surface of each module 18. The detailed arrangement of a decoding module such as that for the character C in the Hollerith code is shown in FIG. 2. The modules are each constructed from a substantially rectangular block of material having uniquely arranged ducts formed therein which convey fluid signals from a supply tube 38 to a control valve. The ducts are formed in one surface of the modules and the modules are then assembled on tie rods 55 into pluralities of modules such as 16 and 17. The blank surface of one module serves to cover the duct surface of an adjacent module. Each module plurality has a common upper plate 56 separated from the modules by guide strip 57. Base strips 58 and 59 are also common to all modules in a plurality. Upper plate 56 is formed with ribs 56a depending therefrom over the document path and the upper document surface of each module 18 is provided with grooves 18a therein. The ribs and aligned groves serve to maintain the document against the decoding surface 60 of a module and yet permit the escape of any pressurized fluid from those modules where required.

In order to hold a document tightly against sensing surface 60, there are provided two types of pressure pins 61 and 62. Pressure pins 61 have an essentially smooth surface at the underside of base portion 63 while the underside of the base portion of a sensing pin 62 is cut out as at 64. Pressure pins 61 block the flow of air in the event there is a document hole thereunder or no document present, while cutout 64 in pin 62 permits the escape of air to atmosphere in the event there is a hole or no card is present. All pressure pins are spring biased downwardly to contact document 11 thereunder and urge the document against the sensing surface 60 by means of the enlarged base portions 63. The bottom edges of all base portions 63 are chamfered so they can be forced upwardly by the edge of a document passing along decoding surface 60.

The decoding module must respond only to its unique arrangement of columnar holes and no other. The module illustrated is to respond only upon sensing the combination of holes representing the character C. Therefore, the module is activated upon sensing holes in the "12" and "3" index positions in a card column. However, since the period (.) in the Hollerith code is represented by holes in the "12," "3" and "8" index positions, this module must have the ability to distinguish between the two characters and remain inactive when the latter hole combination moves over the decoding surface.

Low pressure air is supplied to duct 65 from a tube 38 and flows in the direction of the arrow. The downstream end of the duct terminates at the "8" index position of the module decoding surface 60. A second duct 66 has its upstream end joining duct 65 at substantially right angles thereto near the "8" index position. These ducts form a venting junction which prevents the sensing of subsequent holes in the document column if duct 65 is open to atmosphere, as will be explained hereinafter. The downstream end of duct 66 terminates at the "3" index position adjacent the upstream end of a succeeding duct 67. The downstream end of duct 67 terminates at the "12" index position adjacent the upstream end of duct 68 which communicates with a spool valve chamber 73. At the "3" and "12" index positions of decoding surface 60, the ends of ducts terminating there are of a size such that the two adjacent ends can be encompassed by a single perforation 69 in the document when present.

During sensing the module is activated when a fluid pressure signal is transmitted from duct 65 to spool valve chamber 73. If a document column, therefore, has no hole at the "8" index position, the pressurized fluid will flow from duct 65 into duct 66. If there is a document hole at index position "3," the fluid from duct 66 will be directed into the upstream end of duct 67, since the hole is blocked at the top surface by pin 61. Similarly, if there is a hole also at the "12" index position, the fluid from the downstream end of duct 67 will flow into the duct 68 which communicates with the spool valve chamber. Thus, when holes appear only in the "12" and "3" index positions of a document column, a fluid pressure signal will be transmitted to the spool valve chamber. On the other hand, it will be noted that should a hole appear at the "8" index position the pressurized fluid in duct 65 will be exhausted to atmosphere via the base vent 64 of pressure pin 62. Furthermore, if there is no hole at index positions "12" or "3" fluid flow will be blocked at the blind positions so that no fluid pressure is transmitted to the spool valve chamber. With the arrangement of ducts 65 and 66 substantially as shown, pressurized pulses cannot be transmitted into duct 66 because of the venturi effect reducing the pressure at the junction of these two ducts when fluid from duct 65 is exhausting to atmosphere. By appropriate combinations of the venting junctions and coupling of serially arranged ducts at other index points such as those at the "3" and "12" positions, a module can be made to respond only to a single unique combination of holes in a document column.

Each module 18 has formed therein a chamber 73 with spool valve 74 having three lands formed thereon. The valve chamber is provided with three full annulus ports **72*a*, 72*b* and 72*c*. A duct 75 is provided between ports 72*a* and 72*b* which communicates to the atmosphere. Between ports 72*b* and 72*c* is a duct 76 which communicates with hole 77 that is, in turn, commonly aligned with identical holes of other code plates and ultimately connected to high pressure duct 36 of FIG. 1. The spool valve chamber is closed at the bottom by supporting plate 58 common to all code plates, and has a channel 78 that communicates with atmosphere through port 78*a* in plate 58. An adjustable screw 79 is threadedly inserted in plate 58 and is used to vary the restriction in exhaust channel 78*a***.

At the left of the spool valve chamber there is a recording means which includes chamber 80 closed at the top by bushing 82 and at the bottom by plate 58 and having therein a movable print piston 81. The print piston is fixed on shaft 83 which is secured to print hammer 26 having, in this case, the character of C engraved on the top surface thereof. A duct 84 communicates with annular port **72*b* and chamber 80 above the upper limit of travel of the print piston. Another duct 85 communicates with port 72*c* and chamber 80 below the extreme downward travel of piston 81**. The print piston is formed with a smaller diameter extension underneath which serves to limit its downward travel. Both the piston and spool valve, when moved downward, contact a resilient material to reduce bounce.

When the spool valve is in the static position as shown, the high pressure fluid from port 77 exerts both an upward and downward force against the center and bottom lands of the valve and is effective through channel 84 to urge piston 81 down. The valve lands are each slightly smaller than the chamber diameter so that the high pressure fluid leaks past each of the lands. When the high pressure fluid passes upward it exhausts to atmosphere through channel 75 and exerts no axial force on the spool. Fluid leaking downward exhausts also to atmosphere through channels 78 and **78*a*. The screw in channel 78*a* is adjusted to restrict the duct so that a pressure higher than atmospheric exists under the bottom land to cause valve 74 to remain in the upward position. The high pressure from duct 84 urges the print piston down and fluid beneath the piston exhausts to atmosphere in duct 85, port 72*c* and ducts 78 and 78*a***.

When a proper arrangement of holes is sensed as indicated by fluid flow from the fluid distributor through tube 38 and ducts 65–68, the pressure is sufficient to drive the spool valve 74 down thereby venting the cavity above piston 81 to atmosphere via duct 84, port **72*b* and duct 75. The high pressure fluid from manifold port 77 and duct 76 is then applied through duct 85 to the bottom of the print piston 81 forcing the piston and print hammer 26 upward against the ribbon 27 and edge of the document 11** to record the character on the top margin of the document for the column sensed.

The movement of the print piston upward exposes a feedback duct 88 which connects with duct 78 so that the high pressure fluid below the piston increases the pressure under the spool valve forcing it up to the position shown. This movement of the spool valve again supplies the pressurized fluid through duct 76, port **72*b* and duct 84 to the cavity above the print piston causing it to move downward. The control valve and print piston are now ready to be actuated again when the proper combination of holes occurs in a column. The sensing and printing takes place while the document is in motion. It will be noted in FIG. 2 that a small direct vent 89 is provided for duct 68 which leads to atmosphere adjacent print hammer 26**. The purpose of the vent is to avoid static pressure build-up above the spool valve which would cause possible erratic operation.

With reference to FIGS. 1 and 3 it will be seen that, as the document proceeds serially across the two pluralities of code plates, each code plate is given the opportunity to sense each columnar arrangement of holes in the document and respond by actuation of its print hammer 26. However, since it is often desirable to suppress the translation and printing of the modules for a particular field of data columns, document distributor 37 provides means by which the supply of pressurized fluid can be controlled selectively according to the document columns. When it is necessary to suppress printing for a data field, knurled knob 48 from fluid distributor 37 is removed along with support disc 46 and imperforate disc 47. Since there is a hole for each column in a document in both discs 45 and 46, imperforate disc 47 is punched out at the holes corresponding to document data columns to be suppressed and the discs reassembled on shaft 49. The perforation of disc 47 vents pressurized fluid in any channel 42 aligned with the perforation through holes 51 and 52 in discs 45 and 46. The pressure in that particular channel 42 is thus reduced sufficiently that the module connected thereto cannot function; however, the pressure is restored in channel 42 as soon as the rotating disc assembly on shaft 49 moves on so that an imperforate portion of disc 47 covers the channel. For example, in a document having 80 columns it may be desirable to suppress the interpretation of columns 20 through 29. To accomplish this the ten holes corresponding to those document columns are perforated in disc 47 allowing ten adjacent channels 42 to vent their fluid directly to atmosphere. In addition, multiple fields may be suppressed, since each column is represented by a pair of holes 51 and 52.

The distributor 37 must be synchronized with the movement of a document through modules and complete one revolution for each document transported through the interpreting apparatus. Shaft 49 is, therefore, coupled directly to the cyclic machine drive to maintain the required timed relationship. The circumferential distance of discs 45 and 46 also includes sufficient blind spacing to accommodate the distance a document must travel to the first decoding module or distance between successive documents. Control disc 47, which is to be punched selectively may be paper or plastic sheet, preferably having the location of holes corresponding to card columns printed thereon so that desired holes can be easily punched out.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In apparatus for decoding columnar code indicia contained in a document, the combination comprising:
   a printing element operable in response to a fluid pressure pulse transmitted thereto for printing a designated character;
   sensing means having pressurized fluid supplied thereto connected to said printing means for generating a said pulse upon detecting a predetermined columnar arrangement of said indicia on said document;

means for transporting said document column by column past said sensing means;

manifold means for supplying said pressurized fluid to said sensing means; and control means moving in synchronism with said transport means and said document for disabling or enabling said sensing means in accordance with a predetermined variable format of printed characters.

2. In apparatus for decoding columnar coded perforations contained in a document, the combination comprising:

a printing means responsive to a recording signal supplied thereto for printing a predetermined character;

a decoding means connected to said printing means and actuated by pressurized fluid supplied thereto for generating said recording signal when a predetermined columnar arrangement of perforations is detected on said document;

means for transporting said document column by column in operable relationship with said decoding means;

manifold means for supplying pressurized fluid to said decoding means; and control disc means moving in synchronism with said transport means for disabling or enabling said decoding means in accordance with a predetermined one of variable formats of said columns.

3. In apparatus for translating coded columnar perforations in a document into printed character representations, the combination comprising:

a plurality of printing means, each responsive to a recording signal supplied thereto for printing one of a plurality of designated character representations;

a plurality of decoding means, each connected to a corresponding printing means and operable, when supplied with pressurized fluid, for generating a said recording signal upon detecting a predetermined columnar arrangement of perforations in said document;

means for moving said document column by column along a path adjacent said decoding means;

means for distributing pressurized fluid to each said decoding means; and disc control means connected with said plurality of decoding means for enabling or disabling said decoding means in accordance with a variable printing format.

4. In apparatus for translating columns of coded perforations in a document into printed character representations, the combination comprising:

a plurality of fluid-actuated printing means, each responsive to a recording signal supplied thereto for printing one of a plurality of designated character representations;

a plurality of fluid-actuated decoding means, each connected to a corresponding printing means, and operable by fluid flow therein for generating a fluid recording signal upon detecting a predetermined columnar arrangement of perforations in said document;

means for moving said document column by column in sensing relation with said decoding means;

manifold means for creating fluid flow in each of said decoding means; and venting means adjacent said manifold means moving in synchronism with said document for selectively altering said fluid flow to disable said decoding means for preselected ones of said columns.

5. In apparatus for translating columns of coded perforations in a document into printed character representations, the combination comprising:

a plurality of printing means, each responsive to a recording signal supplied thereto for printing one of a plurality of designated character representations;

a plurality of fluid-actuated decoding means, each connected to a corresponding printing means, and operable by pressurized fluid supplied thereto for generating a recording signal upon detecting a predetermined columnar arrangement of perforations in said document;

means for moving said document column by column in sensing relation with said decoding means;

manifold means for distributing pressurized fluid to each of said decoding means; and cyclic venting means adjacent said manifold means moving in synchronism with said documents for releasing said fluid pressure and disabling said decoding means for preselected ones of said columns.

6. Apparatus as described in claim 5 wherein said venting means includes an imperforate member having perforations selectively located therein to correspond with said preselected columns.

7. In apparatus for translating columns of coded perforations in a document into printed character representations, the combination comprising:

a plurality of fluid-actuated printing means, each responsive to a recording signal supplied thereto for printing one of a plurality of designated character representations;

a plurality of fluid-actuated decoding means, each connected to a corresponding printing means, and operable by pressurized fluid supplied thereto for generating a recording signal upon detecting a predetermined columnar arrangement of perforations in said document;

means for moving said document column by column in sensing relation with said decoding means;

distributing means for supplying pressurized fluid to each of said printing and decoding means; and means control synchronized with said document movement for enabling or disabling said decoding means for selected pluralities of columns to produce a selected prearranged format of said printed represenations.

8. Apparatus as described in claim 7 wherein said synchronized means include an imperforate member supported for cyclic operation and having a perforation corresponding to each column in said pluralities of columns.

References Cited

UNITED STATES PATENTS

| | | | |
|---|---|---|---|
| 1,608,837 | 11/1926 | Bryce | 101—93 |
| 2,027,033 | 1/1936 | Ford | 235—61.117 |
| 2,072,447 | 3/1937 | Gray | 235—61.12 |
| 2,227,141 | 12/1940 | Kleinschmidt | 101—93 |
| 2,510,552 | 6/1950 | Carroll et al. | 235—61.11 |
| 2,979,255 | 4/1961 | Hubl | 235—61.117 |
| 3,202,180 | 8/1965 | Gray | 235—201 X |
| 3,241,669 | 3/1966 | Schonfeld | 235—200 X |

WILLIAM B. PENN, *Primary Examiner.*